(12) United States Patent
Chien et al.

(10) Patent No.: US 9,819,411 B2
(45) Date of Patent: Nov. 14, 2017

(54) SIGNAL TO NOISE RATIO ESTIMATION IN OPTICAL COMMUNICATION NETWORKS

(71) Applicant: ZTE Corporation, Shenzhen (CN)

(72) Inventors: Hung-Chang Chien, Bridgewater, NJ (US); Zhensheng Jia, Morganville, NJ (US); Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 16 days.

(21) Appl. No.: 14/883,563

(22) Filed: Oct. 14, 2015

(65) Prior Publication Data

US 2016/0112122 A1 Apr. 21, 2016

Related U.S. Application Data

(60) Provisional application No. 62/064,336, filed on Oct. 15, 2014.

(51) Int. Cl.
*H04B 10/08* (2006.01)
*H04B 10/073* (2013.01)

(52) U.S. Cl.
CPC .................. *H04B 10/073* (2013.01)

(58) Field of Classification Search
CPC ........ H04B 10/07953; H04B 10/07955; H04B 10/0795; H04B 10/0793; H04B 10/0775

USPC .... 398/25, 26, 27, 33, 34, 38, 79, 158, 159, 398/160, 37, 177, 180, 181; 356/73.1

See application file for complete search history.

(56) References Cited

U.S. PATENT DOCUMENTS

| | | | |
|---|---|---|---|
| 6,907,197 B2 * | 6/2005 | Heath | ............... H04J 14/02 398/25 |
| 2015/0365165 A1 * | 12/2015 | Rasmussen | ........ H04B 10/0775 398/26 |

* cited by examiner

*Primary Examiner* — Hanh Phan
(74) *Attorney, Agent, or Firm* — Perkins Coie LLP

(57) ABSTRACT

Optical signal to noise ratio within a band of interest (in-band OSNR) is calculated by using a reference signal for noise estimation. In-band noise at a node along the optical communication path is estimated by subtracting the reference signal contribution from the received in-band signal energy. Contribution from the reference signal is calculated using an effective transfer function of the optical communication path using either a direct method in which measurements are made a priori on an equivalent optical system or an indirect method in which the effective transfer function is calculated using computerized simulations. The selection of which method to use may be based on the desired resolution bandwidth for the estimation of transfer function.

12 Claims, 11 Drawing Sheets

SIGNAL TO NOISE RATIO ESTIMATION IN OPTICAL COMMUNICATION NETWORKS

CROSS REFERENCE TO RELATED APPLICATIONS

This patent document claims the benefit of U.S. Provisional Patent Application No. 62/064,336, filed Oct. 15, 2014. The entire content of the before-mentioned patent application is incorporated by reference herein.

BACKGROUND

This application relates to optical communication techniques, devices and systems.

With the advent of transmission of multimedia content such as video over the Internet and other communications networks, there is a need for increased data rate capacity on communication networks. For example, in optical networks for backbones of communications networks, the traffic at the edges of the networks can aggregate to several gigabits of network traffic or higher, which can be difficult to handle by some existing optical network deployments. One way to meet increasing needs of optical communications network data capacity is to expand the optical fiber network infrastructure. However, laying down optical transmission media such as fiber links and associated fiber optical modules and subsystems requires significant capital expenditure and may not always be a suitable option due to the expenses involved, deployment limitations and certain regulatory issues.

SUMMARY

In some disclosed embodiments, optical signal to noise ratio within a band of interest (in-band OSNR) is calculated by using a reference signal for noise estimation. In-band noise at a node along the optical communication path is estimated by subtracting the reference signal contribution from the received in-band signal energy. Contribution from the reference signal is calculated using an effective transfer function of the optical communication path using either a direct method in which measurements are made a priori on an equivalent optical system or an indirect method in which the effective transfer function is calculated using computerized simulations. The selection of which method to use may be based on the desired resolution bandwidth for the estimation of transfer function.

In one example aspect, a method of measuring, at a test node, operating condition of an optical communication path between a source node at which a source signal ingresses the optical communication path and the test node, the optical communication path comprising at least one additional optical node and an optical transmission medium interconnecting the source node, the test node and the at least one additional optical node, wherein each node a bandlimiting distortion from its input to output is disclosed. The method includes obtaining an estimate of a reference signal at the source node prior to the source signal entering the optical transmission medium at the source node. The method includes determining an equivalent transfer function through which the source signals traverses before reaching the test node. The method includes computing a noise level at the test node using the equivalent transfer function. The method includes measuring an optical signal to noise ratio at the test node as a ratio of energy in signal received at the test node and the estimated noise level.

In another example aspect, an optical communication system includes a plurality of optical nodes, each optical node configured to carry, from its input to its output, an optical signal along an optical communication path. One of the plurality of optical nodes being a source node at which a source signal having a pre-determined signal bandwidth ingresses the optical communication path and a test node at which the optical communication path is monitored. At least some of the plurality of optical nodes include a wavelength selective switch (WSS) that introduces a bandlimiting distortion in the source signal. The system also includes a monitoring apparatus that implements a method that includes obtaining an estimate of a reference signal at the source node prior to the source signal entering the optical transmission medium at the source node, determining an equivalent transfer function through which the source signals traverses before reaching the test node, computing a noise level at the test node using the equivalent transfer function and measuring an optical signal to noise ratio at the test node as a ratio of energy in signal received at the test node and the estimated noise level.

These, and other, features are disclosed in the present document.

DETAILED DESCRIPTION

In present day communication networks, most of the data and internet traffic, e.g., mobile communication voice, video and internet data traffic, voice over internet protocol (VOIP) phone calls, etc., travels through an optical communication path at one time or another during transmission from a sender to a receiver. The more geographically separated the sending and receiving devices are, the more inevitable it is that the data transmission is carried via an optical communication network. Inter-city and inter-country carriage of data and voice traffic is almost exclusively performed using optical transmission networks. Conversely, any disruption or degradation in an optical communication network therefore may affect user experience of hundreds or thousands of subscribers, not to mention potential to disrupt emergency or mission critical data communication.

Optical network operators therefore closely monitor performance of their networks for any disruptions or quality degradation so that potential problems can be caught and dealt with early enough to prevent a wide scale service disruption. For example, some optical test and measurement (T & M) tools continually monitor optical signal to noise ratio (OSNR) of the optical medium in the channels used for optical communication. The techniques disclosed in the present document can be used to provide a less invasive and/or more accurate technique for monitoring performance of an optical communication network.

Figure 1:
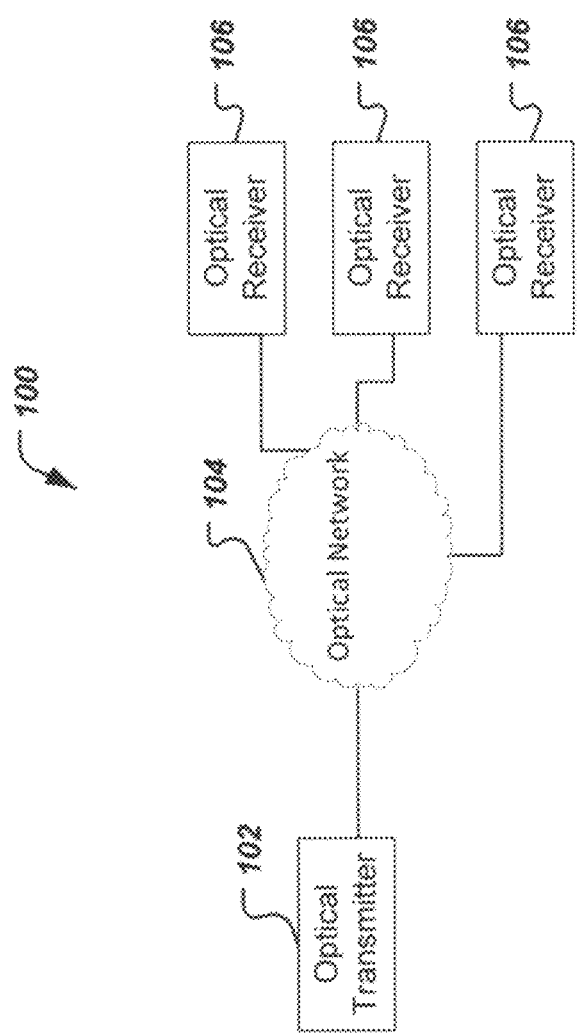
FIG. 1 depicts an example optical communication system.

FIG. 1 is a block diagram for an example of an optical communication system 100 where the subject technology of this document can be implemented. An optical transmitter 102 transmits optical signals through an optical network 104 to one or more optical transceivers 106. The transmitted optical signals may go through intermediate optical equipment such as amplifiers, optical add-drop multiplexers, switches, etc., which are not shown in FIG. 1 for clarity.

As such, the optical communication path between a source node, e.g., transmitter 102, and another node in the network, e.g., a transceiver 106, may include one or more optical nodes such as amplifiers, optical add-drop multiplexers, which are connected to each other via an optical communication medium such as glass fiber or plastic. For example, a communication path between two cities, e.g., New York and Los Angeles, may contain several tens of optical add-drop multiplexers/repeaters or and optical amps every 10 kilometers or so. Typically the OSNR monitoring in today's optical communication systems is based on the measurement of out-of-band noise level at the network node of interest. This is because the optical channel spacing is wide enough such that the in-band noise level can be approximated by the out-of-band noise level, which is easier to be measured. Unfortunately, this may not be the case for next-generation optical transmission systems pursuing high spectral efficiency since the desired channel spacing will be much narrower so that the out-of-band noise level is no longer detectable. As a result, in-band OSNR monitoring techniques that can accurately detect the in-band noise level is becoming more and more important.

Figure 2:
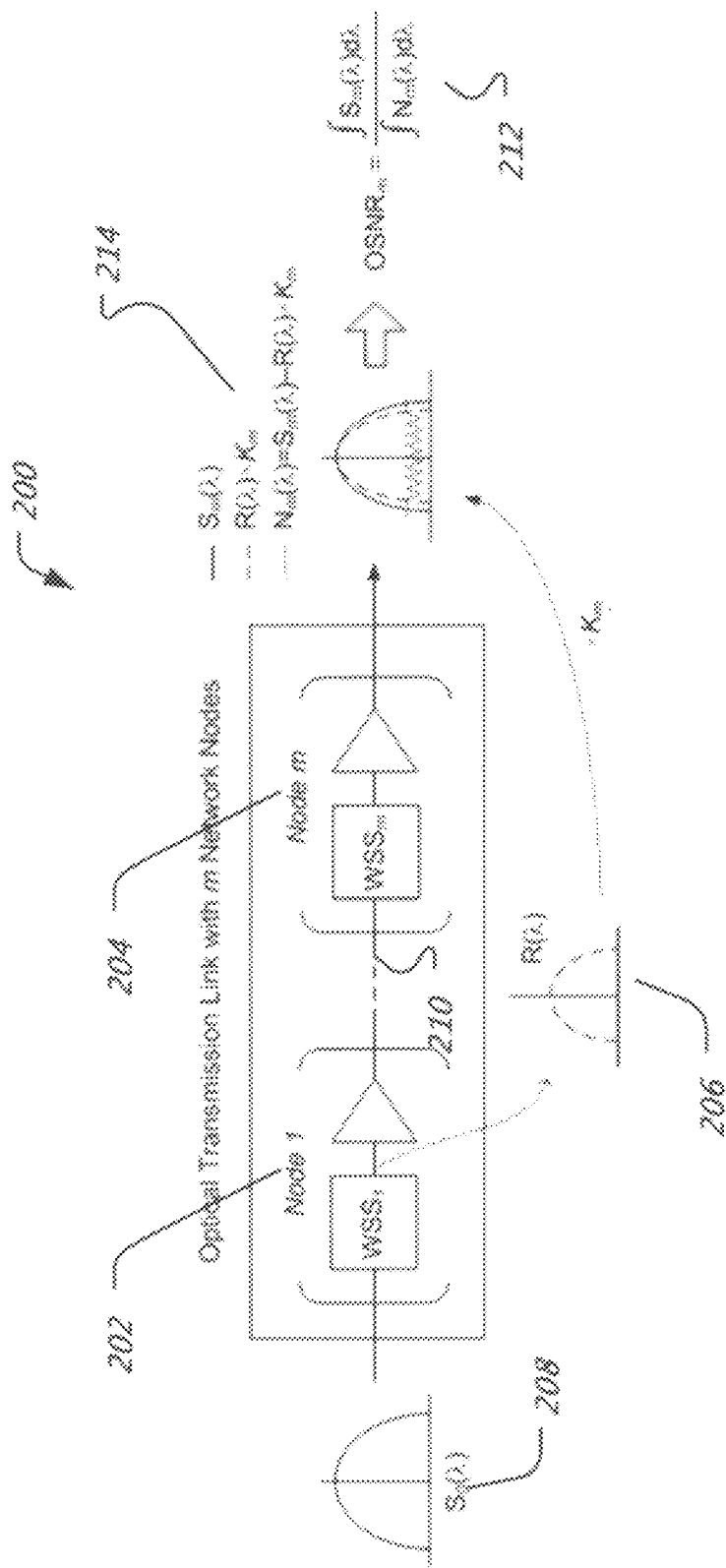
FIG. 2 shows an example of an optical link monitoring technique.

FIG. 2 shows an example of a system 200 in which in-band OSNR of an optical path 210 is monitored. To measure the in-band optical signal-to-noise (OSNR) ratio at each network node 202, 204, the system 200 obtains a clean reference (e.g., noise-free) optical spectrum $R(\lambda)$ 206, which is usually available at the first node, which is the source node at which the signal with spectrum $S_0(\lambda)$ 208 is injected into the optical communication path 210. This clean reference signal is typically obtained after any optical filtering at the source node but before the optical amplification and transmission ($\lambda$ represents wavelength of the light). For the signal under test at $m^{th}$ node 204, its in-band noise distribution $N_m(\lambda)$ is defined as the difference between the signal's spectrum $S_m(\lambda)$ at the $m^{th}$ node, and its noise-free portion $R(\lambda) \times K_m$. The factor $K_m$ is a scaling factor that is used in this calculation and, in some embodiments, is equal to the scaling to make the peak powers of $S_m(\lambda)$ and $R(\lambda) \times K_m$ equal. Next, the in-band OSNR is obtained by calculating the ratio of signal power (integral of $S_m(\lambda)$) to noise power (integral of $N_m(\lambda)$), as shown in 212.

Figure 3:
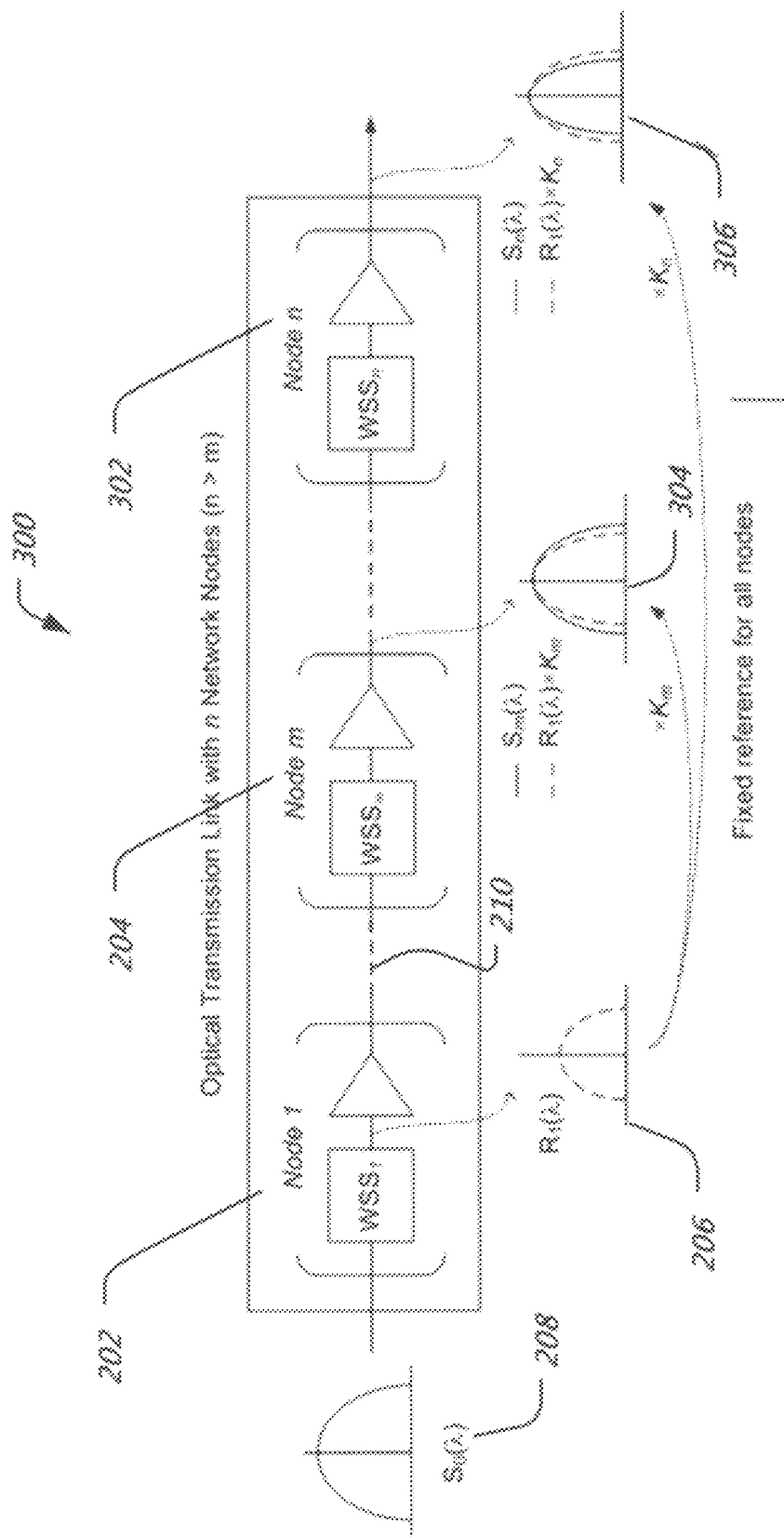
FIG. 3 shows an example of spectrum distortions in the optical link monitoring technique of FIG. 2.

FIG. 3, which illustrates an example optical communication system 300 (which may be similar to the above-discussed system 200), can be used to explain a limitation of present day techniques which is that the signal under test (SUT) may suffer from bandwidth narrowing effect when passing through a sequence of network nodes, especially when a wavelength selective switch (WSS) is used. The narrowing of bandwidth of SUT is depicted in spectra 304 and 306. Such bandwidth narrowing effect may make the spectrum of SUT $S_m(\lambda)$ narrower than that of the fixed reference $R(\lambda)$, e.g., as depicted in 306. In other words, in the OSNR calculation, the reference has more power than the SUT. Thus, the resulting OSNR estimation by using prior art techniques may become incorrect and also invalid in view of the law of energy conservation.

Figure 4:
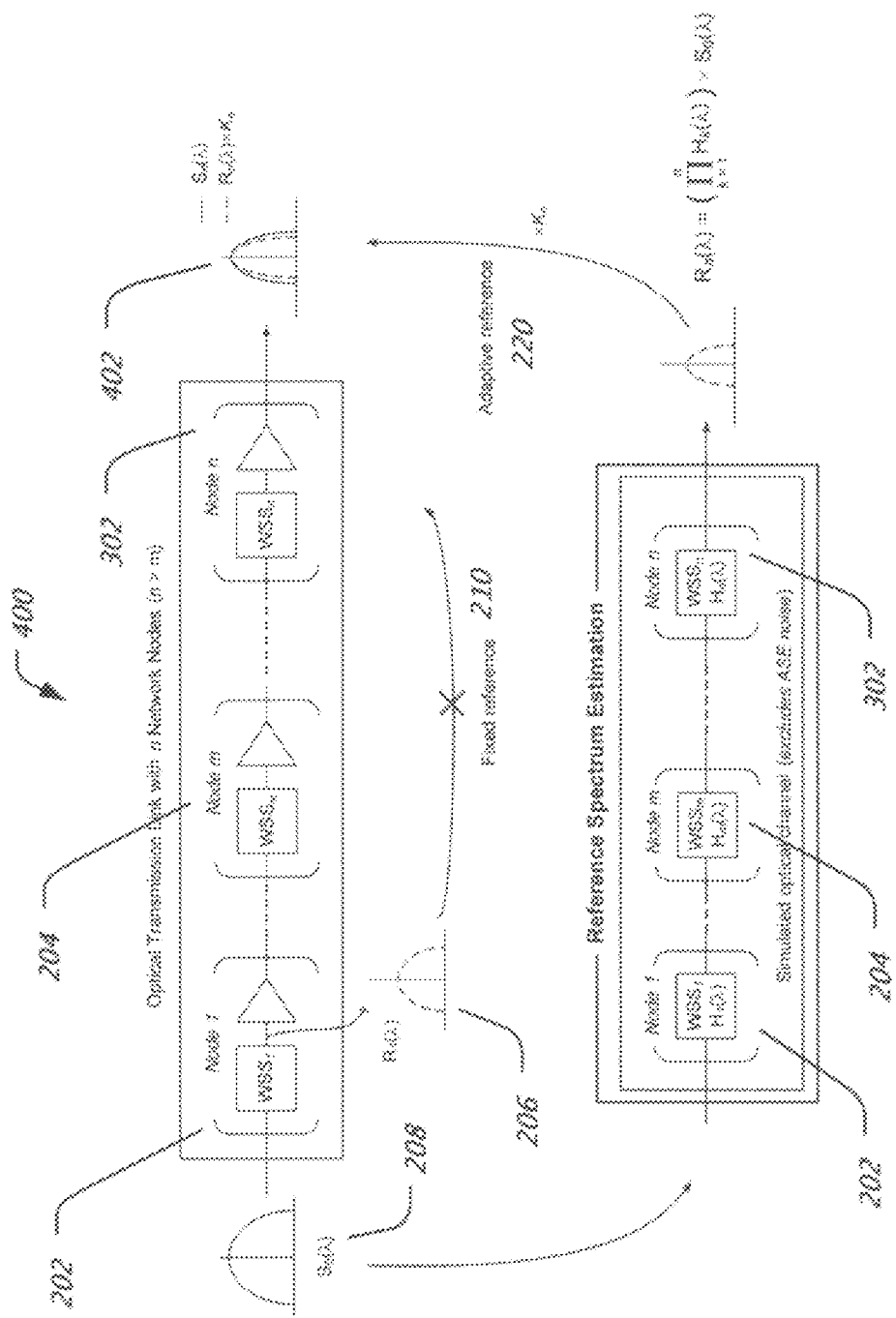
FIG. 4 shows an example of a reference-based in-band SNR link monitoring technique.

As depicted in FIG. 4, in some disclosed embodiments, instead of using a fixed reference 210 (e.g., above-discussed $R(\lambda)$), an adaptive reference 220 is used at each network nodes at which OSNR is monitored. Such adaptive reference spectrum undergoes the same bandwidth narrowing effect that the SUT goes through, and as a result, the adaptive reference spectrum is a better representation of the reference spectrum at the test node. In another advantageous aspect, by taking into account the spectral narrowing effect of optical nodes, the reference spectrum used in OSNR calculations will not be wider than that of SUT at each node. For example, 402 depicts an example graph of spectra of SUT and the estimate of reference spectrum at node n 302.

Figure 5:
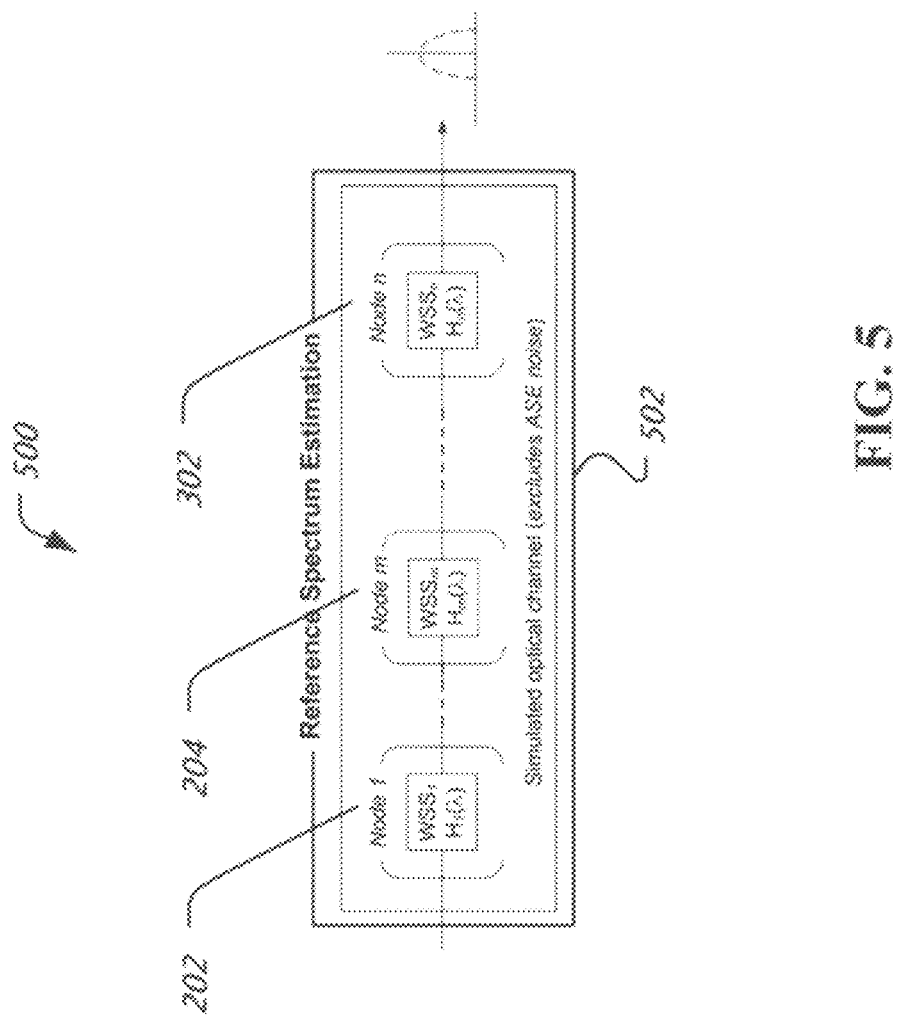
FIG. 5 shows an example of a technique for reference based estimation of SNR.

FIG. 5 shows an example technique 500 of reference signal estimation. To conduct the reference signal estimation, a simulated optical channel 502, excluding the optical amplifiers, can be built either using actual components, or as a software model. Assuming that there are n nodes and each node has one WSS with a unique transfer function $H_k(\lambda)$, where k=1 to n. The end-to-end transfer, or equivalent, function is $H_e(\lambda)$. The estimated reference spectrum $R_n(\lambda)$ is then given by $$R_n(\lambda) = H_k(\lambda) \times S_0(\lambda) \qquad \text{Eq. (1)}$$

There are at least two approaches to obtain $H_e(\lambda)$: a direct method and an in-direct method.

In some embodiments of a direct method, $H_e(\lambda)$ is estimated through an end-to-end measurement of actual optical signals. A physical channel using substantially similar WSS parts at each nodes can be built offline. For evaluation of the transfer function, optical amplifiers would be excluded from this optical path built in a test facility. Using this scheme, the transfer function $H_e(\lambda)$ is seen as a black box. In other words, the contribution from individual nodes may not matter other than their contribution to the multiplicative product at the $n^{th}$ cascade stage. Using this test setup, a signal can be injected into the optical communication path and $R_n(\lambda)$ and $S_0(\lambda)$ may be recorded at each test node along the optical communication path. In this way, the network operator can have a complete look-up table of $H_e(\lambda)$ for any network topology of the network being used.

In some embodiments of the in-direct method, $H_e(\lambda)$ is estimated digitally. In some embodiments, where the raw data of $H_k(\lambda)$ is known and available, considering that $H_e(\lambda)$ is the product of every $H_k(\lambda)$ involved in the cascade of nodes in the optical communication path, $R_n(\lambda)$, which represents the reference signal spectrum at a node n, is given by:

$$R_n(\lambda) = \left( \prod_{k=1}^{n} H_k(\lambda) \right) \times S_0(\lambda) \qquad \text{Eq. (2)}$$

Each transfer function $H_k(\lambda)$ depends on the resolution bandwidth (RBW) as discussed below. The value computed from the above multiplication can then be used to estimate the OSNR at each test node.

Figure 6:
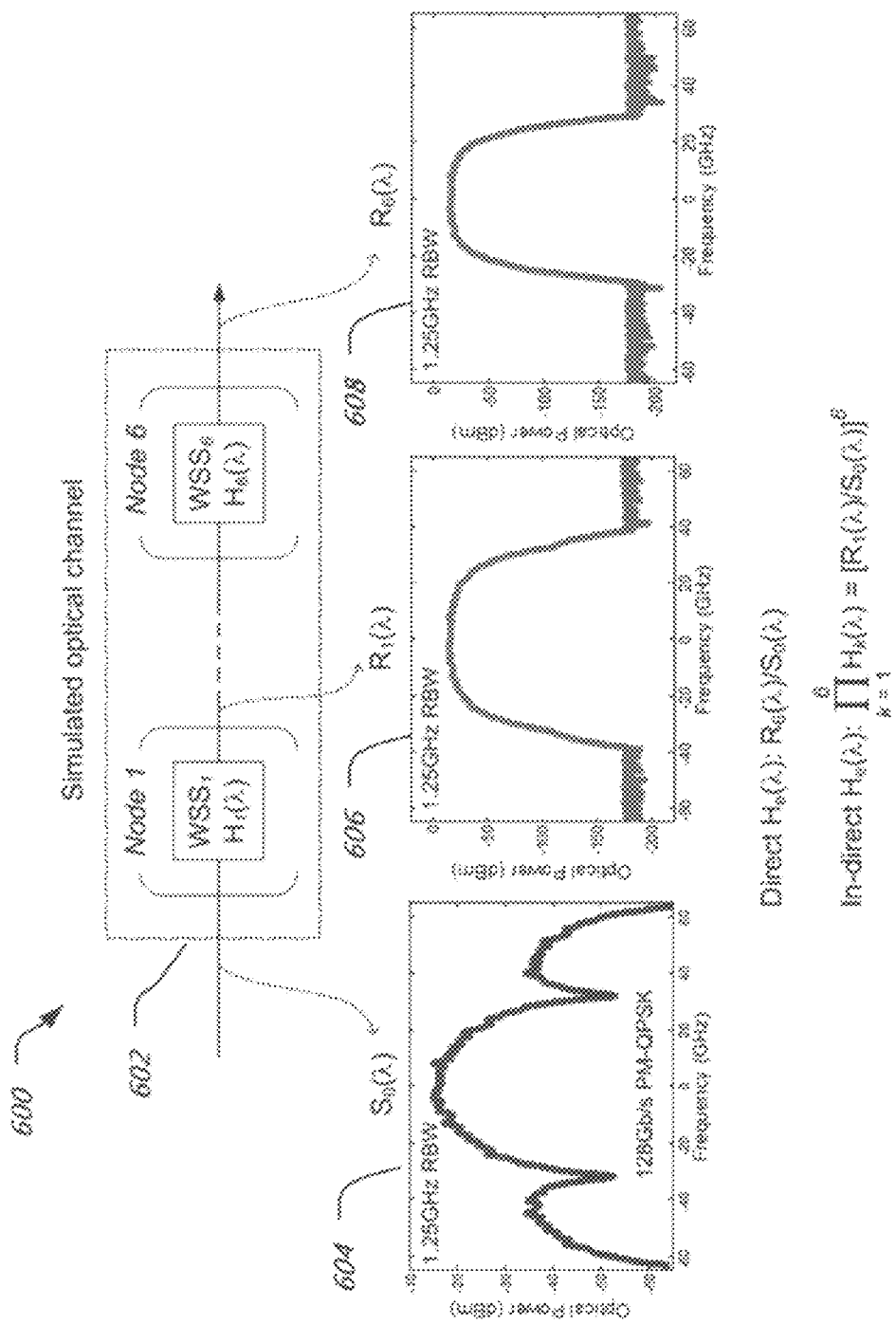
FIG. 6 shows an example transfer function frequency response.

FIG. 6 shows example spectra obtained when a simulated optical channel was staged to make measurements of the effective transfer function of the optical communication path. The staged optical communication path 602 included a cascade of six nodes, with each node having a WSS. For simplicity, all WSS were selected to have the same spectral characteristics. Simulations and measurements show that both direct and in-direct $H_e(\lambda)$ match well at 1.25 GHz resolution bandwidth (RBW). RBW is the spectral resolution of $H_e(\lambda)$. As can be seen from graphs 604, 606 and 608, the passband of the in-band reference signal reduces from the first node output (606) to the sixth node output (608).

It will be appreciated by one of skill in the art that although the direct method may mean more engineering efforts to build a test setup, once measurements are done, a full look-up table of $H_e(\lambda)$ can be obtained and is usable for multiple different RBW settings.

On the other hand, although the in-direct method is flexible and does not require too many physical resources such as a lab set-up or making time-consuming offline measurement for simulating all possible network topologies, the in-direct method may be good for small RBW, and as the RBW increases, the deviation between both transfer functions may become significant.

Figure 7:
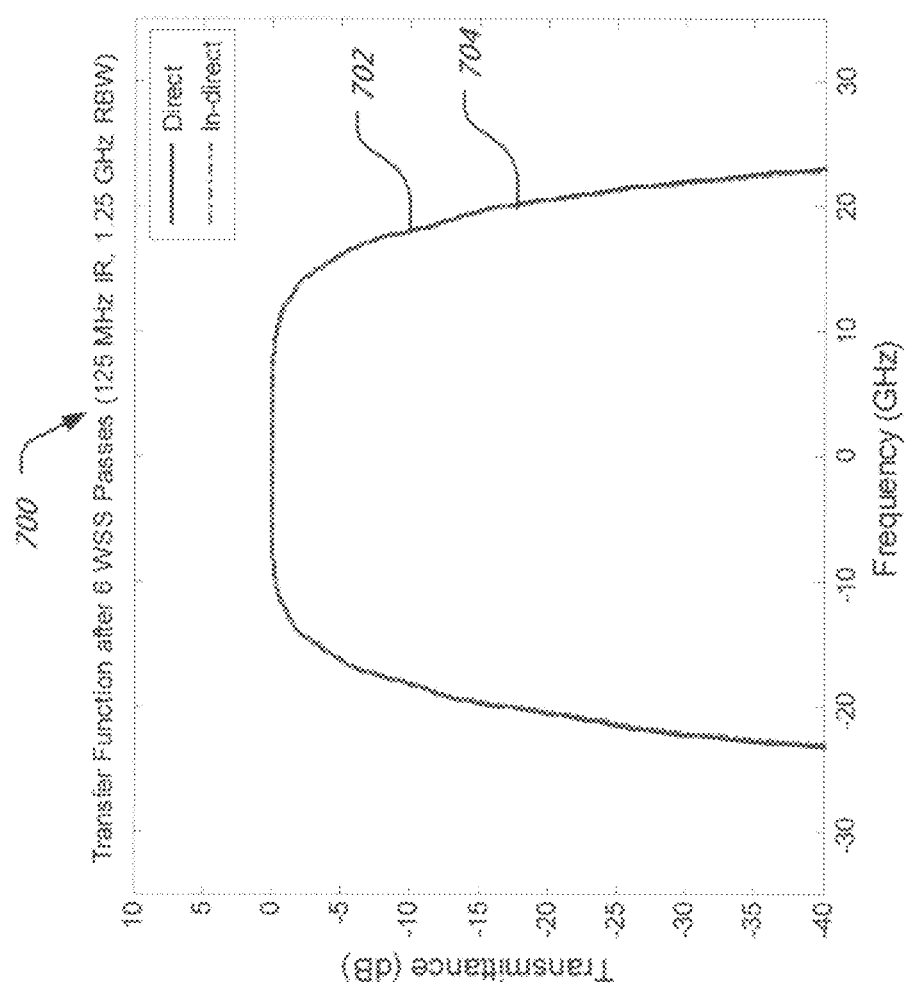
FIG. 7 shows example results obtained using direct and indirect method for 1.25 GHz resolution bandwidth.

FIG. 7 shows an example graph 700 of estimated transfer function using the direct method (curve 702) and the indirect method (Curve 704). At 1.25 GHz RBW, the difference in the estimated transfer function is negligible.

Figure 8:
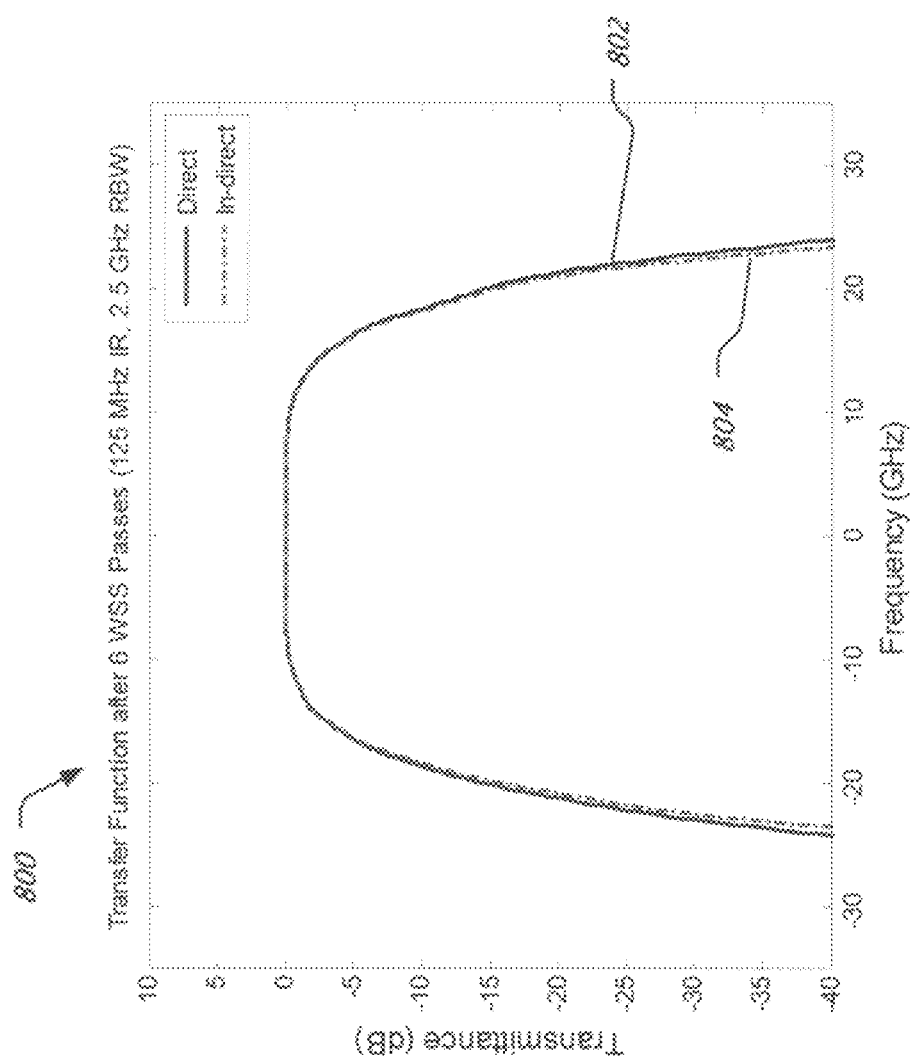
FIG. 8 shows example results obtained using direct and indirect method for 2.5 GHz resolution bandwidth.

FIG. 8 shows an example graph 800 of estimated transfer function using the direct method (curve 802) and the indirect method (Curve 804) using 2.5 GHz RBW. It can be seen that the estimated transfer function from the in-direct method has a slightly narrower bandwidth compared to that from the direct method, with the curves 802 and 804 visibly non-overlapping at higher frequencies.

Figure 9:
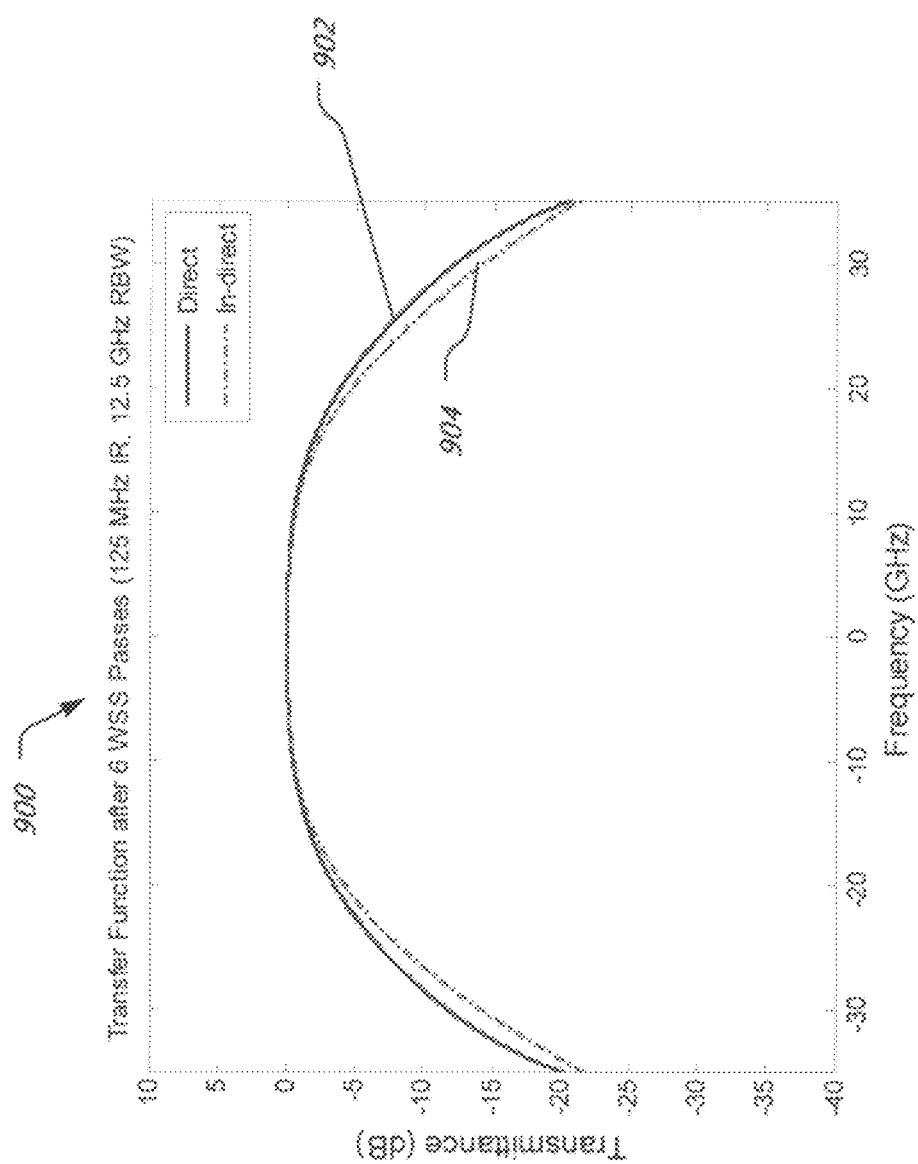
FIG. 9 shows example results obtained using direct and indirect method for 12.5 GHz resolution bandwidth.

FIG. 9 shows an example graph 900 of estimated transfer function using the direct method (curve 902) and the indirect method (Curve 904) at 12.5 GHz RBW. The difference in the estimated transfer function grows even more, compared to FIG. 8. Thus, depending on the available RBW of an optical spectrum analyzer (OSA), if low RBW (i.e. 1.25 GHz and below) is not available, the direct method may be the right way to go. However, if low RBW is available, one or other of the two approaches for estimation of transfer function may be used. 1.25 GHz is a commonly achievable RBW in today's OSA modules, and even lower RBW can be highly expected in the near future.

Figure 10:
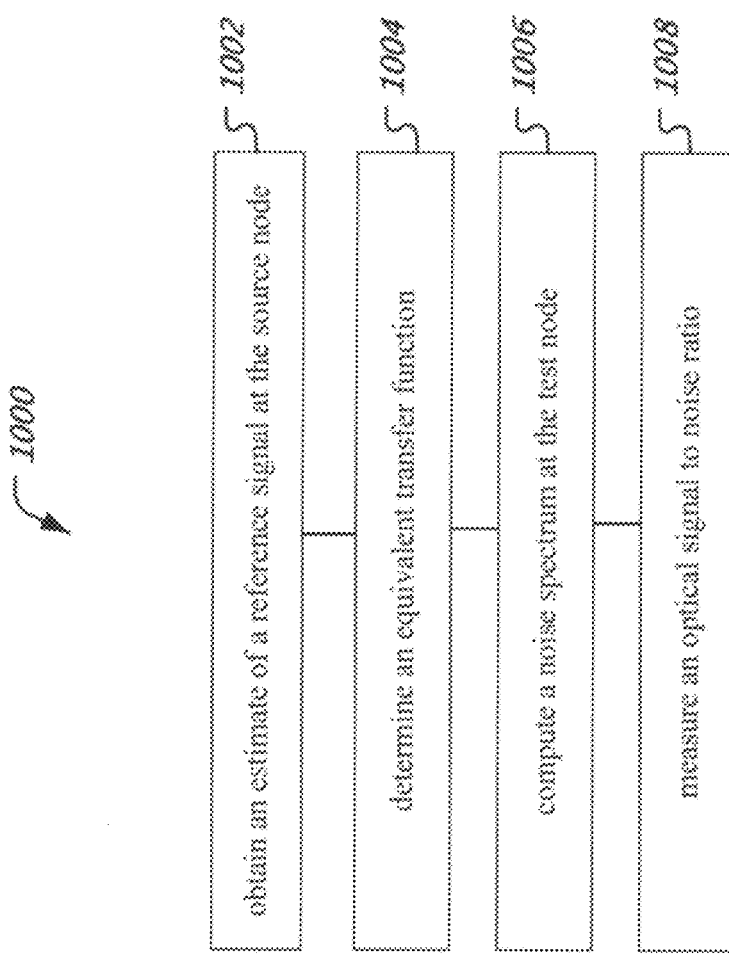
FIG. 10 is a flow chart representation of a process implemented in an optical communication network.

FIG. 10 shows an example flowchart of a method 1000 of measuring, at a test node, the operating condition of an optical communication path between a source node and the test node. The source node is where a source signal ingresses the optical communication path. The optical communication path between the source node and the test node may include at least one additional optical node and an optical transmission medium interconnecting the source node, the test node, and the at least one additional optical node. The optical transmission medium may be, e.g., a glass or plastic optical fiber. Each node introduces a bandlimiting distortion from its input to output. The operating condition may be optionally presented on an operator console so that the working condition of the optical network can be monitored by the network operator. Various graphical user interface widgets may be used, e.g., charts, graphs, color coded messages, etc. for providing information about the operational condition of the optical network.

The method 1000 includes, at 1002, obtaining an estimate of a reference signal at the source node prior to the source signal entering the optical transmission medium at the source node. For example, as depicted in FIG. 3, the reference signal may be recorded using a spectrum analyzer at the output of the WSS, but before entering a subsequent optical amplifier, and stored in a computer memory as a number of samples. The number of frequency domain samples stored may depend on the resolution bandwidth (RBW) selected.

The method 1000 includes, at 1004, determining an equivalent transfer function through which the source signals traverses before reaching the test node. In some embodiments, the determining the equivalent transfer function includes calculating the equivalent transfer function as a multiplication of individual transfer functions of nodes in the optical communication path between the source node and the test node.

In some embodiments, the determining the equivalent transfer function includes making a priori measurements on equipment matching equipment that is used in the optical communication path and performing measurements on the setup to determine the equivalent transfer function.

In some embodiments, the determining the equivalent transfer function includes selecting an RBW for the determining and performing, based on the selected RBW, one of a direct method in which the determining is performed by measurements of a staged equivalent optical communication path, and an indirect method in which the determining is performed via a computer-based calculation.

The method 1000 includes, at 1006, computing a noise level at the test node using the equivalent transfer function. Techniques for computation of noise level using the equivalent transfer function, e.g., $H_e(\lambda)$, are described herein, e.g., with respect to Eq. (1) and Eq. (2).

The method 1000 includes, at 1008, measuring an optical signal to noise ratio at the test node as a ratio of energy in signal received at the test node and the estimated noise level.

In some embodiments, an optical communication apparatus includes a memory that stores data and instructions and a processor that reads the instructions from the memory and implements a method for monitoring in-band signal to noise ratio of an optical communication path between a source node at which a source signal ingresses the optical communication path and a test node, the optical communication path comprising at least one additional optical node and an optical transmission medium interconnecting the source node, the test node and the at least one additional optical node, wherein each node a bandlimiting distortion from its input to output. The method includes obtaining an estimate of a reference signal at the source node prior to the source signal entering the optical transmission medium at the source node, determining an equivalent transfer function through which the source signals traverses before reaching the test node, computing a noise level at the test node using the equivalent transfer function, and measuring an optical signal to noise ratio at the test node as a ratio of energy in signal received at the test node and the estimated noise level.

Figure 11:
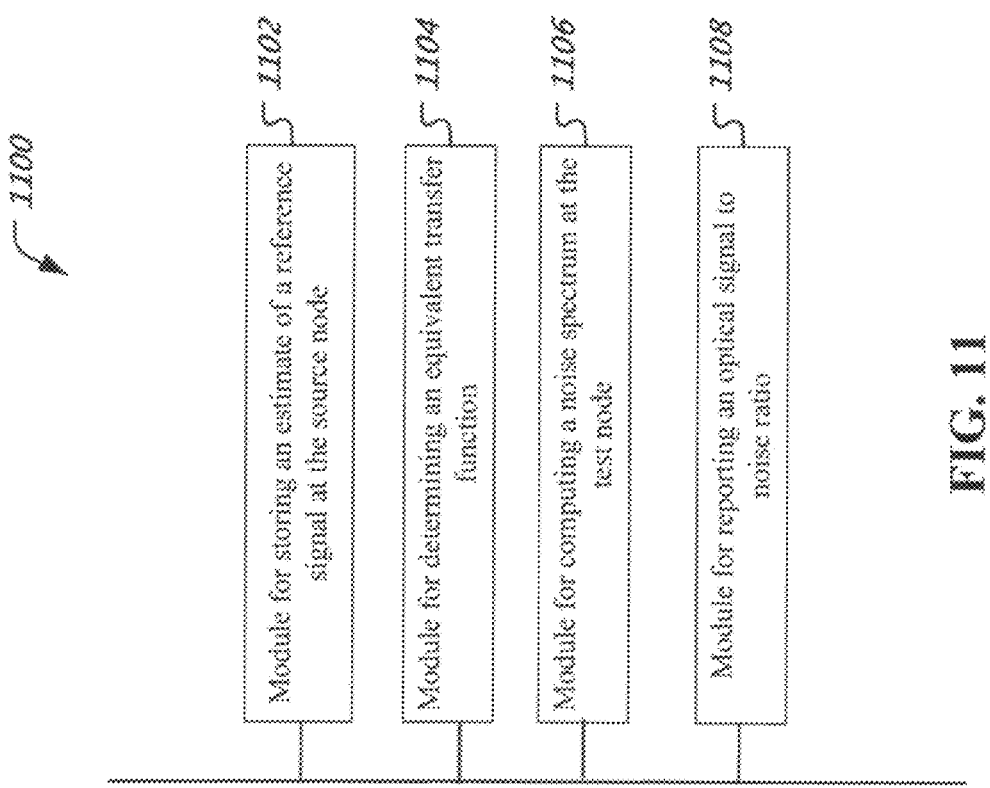
FIG. 11 is a block diagram representation of an optical monitoring apparatus.

FIG. 11 shows an example block diagram of an optical network monitoring apparatus 1100. The module 1102 is for storing an estimate of a reference signal at the source node. The module 1102 may be, e.g., a storage device (memory, hard drive, etc.) at the apparatus 1100. The module 1104 is for determining an equivalent transfer function. For example, the module 1104 may be an FPGA circuit. The module 1106 is for computing a noise spectrum at the test node. The spectrum calculation may be performed using a Fourier transform calculation based on a number of points as specified by the resolution bandwidth. The module 1108 is for reporting an optical signal to noise ratio to an operator console.

In some embodiments, an optical communication system includes a plurality of optical nodes, each optical node configured to carry, from its input to its output, an optical signal along an optical communication path. One of the plurality of optical nodes being a source node at which a source signal having a pre-determined signal bandwidth ingresses the optical communication path, and a test node at which the optical communication path is monitored. In some exemplary embodiments, at least some of the plurality of optical nodes include a wavelength selective switch (WSS) that introduces a bandlimiting distortion in the source signal; and a monitoring apparatus that implements a method that includes obtaining an estimate of a reference signal at the source node prior to the source signal entering the optical transmission medium at the source node, determining an equivalent transfer function through which the source signals traverses before reaching the test node, computing a noise level at the test node using the equivalent transfer function and measuring an optical signal to noise ratio at the test node as a ratio of energy in signal received at the test node and the estimated noise level.

In some embodiments, in-band optical signal to noise ratio at an optical node is determined as follows. First, a known source signal is transmitted from a transmitting node (e.g., node 202). Next, a reference signal measurement is made on output of a WSS at the transmitting node, but prior to injecting signals into an optical amplifier. This spectrum may be stored in memory (e.g., spectrum 206). The effective transfer function of the optical signal path is calculated by multiplying transfer function of each intervening node (e.g., nodes 202, 204, 302 of optical path 210). Then, a noise spectrum is estimated by subtracting from signal received at the optical node the contribution of the reference signal (e.g., FIG. 2, reference 214). Finally, the ONSR is calculated as a ratio of the received signal power over the in-band frequency region, i.e., the band of interest, and the noise power over the same spectrum. The OSNR may be made available via an operator console to the operator of the optical network. The operator can set alarm conditions such that an alarm may be raised when the OSNR falls below a pre-determined threshold.

It will be appreciated that the present document discloses techniques to improve the calculation of in-band OSNR when monitoring the performance of an optical communication network. In one advantageous aspect, the disclosed technique refine the determination of end-to-end effective transfer function used for the estimation of reference signal by taking into account bandlimiting effect of intermediate optical nodes. In another advantageous aspect, a computer-based method for determining the effective transfer function is disclosed in which actual equipment set-up and making measurements in a test lab are avoided.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of measuring, at a test node, operating condition of an optical communication path between a source node at which a source signal ingresses the optical communication path and the test node, the optical communication path comprising at least one additional optical node and an optical transmission medium interconnecting the source node, the test node and the at least one additional optical node, wherein each node a bandlimiting distortion from its input to output, comprising:
   obtaining an estimate of a reference signal at the source node prior to the source signal entering the optical transmission medium at the source node;
   determining an equivalent transfer function through which the source signals traverses before reaching the test node;
   computing a noise level at the test node using the equivalent transfer function; and
   measuring an optical signal to noise ratio at the test node as a ratio of energy in signal received at the test node and the estimated noise level.

2. The method of claim 1, wherein the determining the equivalent transfer function includes:
   calculating the equivalent transfer function as a multiplication of individual transfer functions of nodes in the optical communication path between the source node and the test node.

3. The method of claim 1, wherein the determining the equivalent transfer function includes:
   making a priori measurements on equipment matching equipment that is used in the optical communication path; and
   performing measurements on the setup to determine the equivalent transfer function.

4. The method of claim 1, wherein the determining the equivalent transfer function includes:
   selecting a resolution bandwidth (RBW) for the determining; and
   performing, based on the selected RBW, one of a direct method in which the determining is performed by measurements of a staged equivalent optical communication path and an indirect method in which the determining is performed via a computer-based calculation.

5. An optical communication apparatus, comprising:
   a memory configured to store data and instructions; and
   a processor configured to read the instructions from the memory and to implement a method for monitoring in-band signal to noise ratio of an optical communication path between a source node at which a source signal ingresses the optical communication path and a test node, the optical communication path comprising at least one additional optical node and an optical transmission medium interconnecting the source node, the test node and the at least one additional optical node, wherein each node introduces a bandlimiting distortion from its input to output, comprising:
   obtaining an estimate of a reference signal at the source node prior to the source signal entering the optical transmission medium at the source node;
   determining an equivalent transfer function through which the source signals traverses before reaching the test node;
   computing a noise level at the test node using the equivalent transfer function; and
   reporting an optical signal to noise ratio at the test node as a ratio of energy in signal received at the test node and the estimated noise level.

6. The apparatus of claim 5, wherein the determining the equivalent transfer function includes:
   calculating the equivalent transfer function as a multiplication of individual transfer functions of nodes in the optical communication path between the source node and the test node.

7. The apparatus of claim 5, wherein the determining the equivalent transfer function includes;
   staging a setup using equipment matching equipment used in the optical communication path; and
   performing measurements on the setup to determine the equivalent transfer function.

8. The apparatus of claim 5, wherein the determining the equivalent transfer function includes:
   selecting a resolution bandwidth (RBW) for the determining; and
   performing, selectively based on the selected RBW, an indirect method in which the determining is performed via a computer-based calculation.

9. An optical communication system, comprising:
   a plurality of optical nodes, each optical node configured to carry, from its input to its output, an optical signal along an optical communication path,
   one of the plurality of optical nodes being a source node at which a source signal having a pre-determined signal bandwidth ingresses the optical communication path and a test node at which the optical communication path is monitored,
   wherein at least some of the plurality of optical nodes include a wavelength selective switch (WSS) that introduces a bandlimiting distortion in the source signal; and
   a monitoring apparatus comprising a memory storing instructions, and a processor for reading the instructions from the memory and implementing a method, comprising:
   obtaining an estimate of a reference signal at the source node prior to the source signal entering the optical transmission medium at the source node;
   determining an equivalent transfer function through which the source signals traverses before reaching the test node;
   computing a noise level at the test node using the equivalent transfer function; and
   measuring an optical signal to noise ratio at the test node as a ratio of energy in signal received at the test node and the estimated noise level.

10. The system of claim 9, wherein the determining the equivalent transfer function includes:

calculating the equivalent transfer function as a multiplication of individual transfer functions of nodes in the optical communication path between the source node and the test node.

11. The system of claim 9, wherein the determining the equivalent transfer function includes:
staging a setup using equipment matching equipment used in the optical communication path; and
performing measurements on the setup to determine the equivalent transfer function.

12. The system of claim 9, wherein the determining the equivalent transfer function includes:
selecting a resolution bandwidth (RBW) for the determining; and
performing, based on the selected RBW, one of a direct method in which the determining is performed by measurements of a staged equivalent optical communication path and an indirect method in which the determining is performed via a computer-based calculation.

* * * * *